United States Patent [19]

Rice

[11] Patent Number: 5,136,693
[45] Date of Patent: Aug. 4, 1992

[54] ARCHITECTURE FOR A SIGNAL PROCESSING APPARATUS

[75] Inventor: Colin F. Rice, Edgware, United Kingdom

[73] Assignee: The Marconi Company Limited, England

[21] Appl. No.: 524,390

[22] Filed: May 17, 1990

[30] Foreign Application Priority Data

Jun. 7, 1989 [GB] United Kingdom ............... 8913048

[51] Int. Cl.⁵ ..................... G06F 15/00; G06F 15/332
[52] U.S. Cl. .................. 395/275; 364/DIG. 1; 364/228
[58] Field of Search ............... 364/200, 900; 395/275

[56] References Cited

U.S. PATENT DOCUMENTS

| | | | |
|---|---|---|---|
| 4,161,027 | 7/1979 | Russell | 364/492 |
| 4,200,226 | 4/1980 | Piras | 371/11.3 |
| 4,363,104 | 12/1982 | Nussmeier | 364/515 |
| 4,547,845 | 10/1985 | Ross | 364/200 |
| 4,675,803 | 6/1987 | Kendall et al. | 364/131 |
| 4,860,216 | 8/1989 | Linsenmayer | 364/516 |

FOREIGN PATENT DOCUMENTS 1576934 10/1980 United Kingdom .

Primary Examiner—Michael R. Fleming
Assistant Examiner—Glenn A. Auve
Attorney, Agent, or Firm—Kirschstein, Ottinger, Israel & Schiffmiller

[57] ABSTRACT

A data processing apparatus for controlling an equipment by operating control devices (1, 3) of the equipment in dependence on signals produced by sensors (5, 7) wherein the sensor signals are processed in three stages. In the first stage the signals are processed in a processor (11) of high operational speed, i.e. number crunching capabilities, and low decision capability. In the second stage processors (19) of lower operational speed and higher decision capability are used. In the third stage processors (27) of still lower speed but higher decision capability are used. This architecture allows the apparatus to be easily reconfigured for use in a wide variety of different applications.

8 Claims, 1 Drawing Sheet

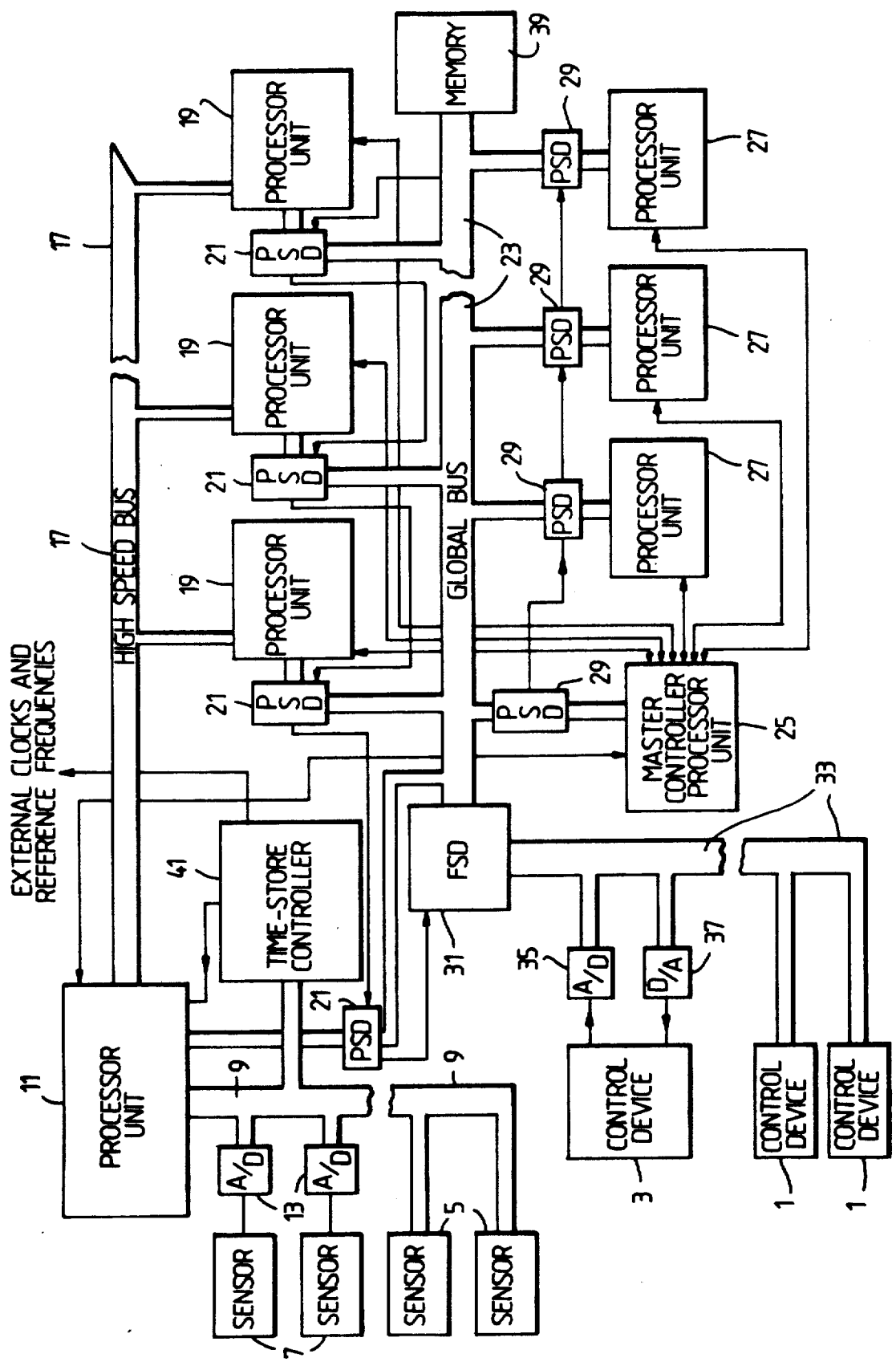

ARCHITECTURE FOR A SIGNAL PROCESSING APPARATUS

BACKGROUND OF THE INVENTION

1. Field of the Invention

This invention relates to signal processing apparatus.

More especially the invention relates to an architecture for signal processing apparatus of the kind suitable for use in carrying out a desired operation by controlling control devices in response to signals derived from sensors. One example of such an operation is manoeuvering an airborne vehicle towards a target in response to signals produced by a radar equipment to facilitate attacking the target with a weapon carried by the vehicle.

2. Description of Related Art

In known such signal processing apparatus the various tasks which have to be carried out in order to effect the desired operation are normally carried out in different sections of a single data processor of appropriate overall capacity. Typically such a task comprises extracting the components of interest from the output signal of a sensor, for example by statistical or Fourier analysis of the sensor output signal, utilising the extracted components to arrive at a conclusion regarding a control function which is under control of the apparatus, and finally deciding whether in the light of the overall desired operation, it is desirable in fact to execute the control function.

One example of such a task is determining from received radar echo signals which of a number of targets is of a type which it is desired to attack.

Another example of such a task is determining from received radar echo signals how best to control an aerodynamic control surface on an airborne vehicle so as to cause the vehicle to travel along a course towards a target.

SUMMARY OF THE INVENTION

It is an object of the present invention to provide a signal processing apparatus having an architecture such as to facilitate the adaptation of the apparatus to any one of a wide range of different applications without changing the basic architecture of the apparatus.

According to the present invention there is provided a signal processing apparatus for carrying out a desired operation in dependence on signals derived from sensors comprising: at least one first data processor having a high operational speed but a low logical decision capability arranged to process data received from said sensors; a plurality of second data processors each having a lower operational speed but a higher logical decision capability than said first processor, and being arranged to process data produced by said at least one first data processor; and a plurality of third data processors each having a lower operational speed but a higher logical decision capability than a said second processor and being arranged to operate control devices in dependence on data produced by said second data processors.

BRIEF DESCRIPTION OF THE DRAWING

One signal processing apparatus in accordance with the invention will now be described, by way of example, with reference to the accompanying drawing which is a block schematic diagram of the apparatus.

DETAILED DESCRIPTION OF THE PREFERRED EMBODIMENT

Referring to the drawing, the apparatus serves to provide control signals for a number of control devices 1, 3 in dependence on signals produced by a plurality of sensors 5, 7. In the drawing two sensors 5 are shown by way of example which produce digital output signals which are supplied via a data bus 9 to a first processor unit 11. A further two sensors 7 are shown, by way of example, which produce analogue output signals and communicate with the processor unit 11 via the data bus 9 by way of analogue to digital converters 13.

The processor unit 11 communicates with a plurality of second data processor units 19 by way of a high speed data bus 17 or by way of a global data bus 23 and a plurality of processor support devices (PSDs) 21, there being one PSD 21 for each second processor unit 19 and one PSD 21 for the processor unit 11.

The second processor units 19 communicate via the global data bus 23 with a plurality of third data processor units 25, 27 by way of their PSDs 21 and further PSDs 29, there being one further PSD 29 for each third processor unit 25 or 27.

One of the third processor units 25 acts as a controller for the whole apparatus, in particular by allocating tasks to the second processor units 19 and other third processor units 27 according to a priority list.

The other third processor units 27 communicate with the control devices 1, 3 via the global databus 23 by way of their PSDs 29 and a front end support device (FSD) 31. In the drawing two digital control devices 1 are shown which communicate with the FSD 31 directly via a data bus 33 and a further analogue control device 3 is shown which communicates with the FSD 31 by way of an analogue to digital converter 35 and a digital to analogue converter 37.

Each of the processor units 11, 19, 25, 27 incorporates a local memory but in addition a large global memory 39 accessible via the global bus 23 is provided.

The various processor units 11, 19, 25, 27, support devices 29 and 31, sensors 5, 7 and control devices 21, 1, 3 operate under the control of timing signals produced by a time-store controller 41.

In accordance with the invention the first, second and third processor units 11, 19 and 25, 27 are essentially of different capabilities. The processor unit 11 is capable of very high speed operation, i.e. so as to be suitable for carrying out large numbers of arithmetical computations very quickly, but has only a low logical decision capability. Thus the processor unit 11 is arranged to carry out appropriate operations such as statistical or Fourier analysis on large numbers of digital values representing successive samples of quantities sensed by the sensors 5, 7. For example, where a sensor 5 or 7 is sensing a radar or sonar echo signal the processor unit 11 may be arranged to carry out a spectrum analysis of the echo signal so as to determine the amplitude and frequency of the frequency component of largest amplitude in the echo signal. Thus, the processor unit 11 typically serves to process, e.g. clean up, the raw data provided by the sensors 5, 7 to render it of a form capable of use in deciding how best to operate the equipment controlled by the control devices 1, 3.

The processor units 19 utilise the processed data produced by the unit 11 to make decisions which need to be made before effecting operation of the control devices 1, 3. To this end the units 19 have a lower operational speed than the unit 11, but a higher logical decision making capability than the unit 11. Thus a unit 19 is typically arranged to process data produced by the unit 11 from raw data provided by one or more of the sensors 5, 7 using an appropriate, i.e. controlled equipment purpose orientated, algorithm to device how best to operate a particular control device 1 or 3. For example, where the controlled equipment is missile and the missile is required to attack a moving target, a processor 19 may utilise processed target echo signals produced by the unit 11 to identify which targets are moving and in what directions, and select one such target for attack.

The processor units 27 utilise the processed data produced by the units 19 and/or the unit 11 to make final decisions regarding operation of the control devices 1, 3 given the desired purpose of the controlled equipment. To this end the units 27 have a lower operational speed than the units 19, but a higher logical decision capability than the units 19. Thus a unit 27 is typically arranged to look at the data produced by one or more of the units 19 together with other data relating to the equipment being controlled e.g. stored data, and then decide if and when to operate an associated control device 1 or 3 and to what degree. For example, in respect of a control device 1 or 3 controlling the position of an aerodynamic control surface of a guided missile, a processor unit 27 may utilise data produced by units 19 indicating the position of a selected target to decide how to position the control surface to direct the missile along a course towards the selected target.

The FSD 31 is arranged to carry out operations on digital data produced by the processor units 27 necessary to adapt the data for use by the particular types of control device 1, 3 present in the controlled equipment. As a consequence the apparatus may be adapted for use with different types of control device by modifying the external interface of the FSD 31 only rather than any of the processor units 11, 19, 25 and 27. Thus the FSD 31 performs the function of what is sometimes called a personality module. A similar device may if desired be used between the sensors 5, 7 and the first processor unit 11.

The PSDs 21 perform a similar function in respect of the processor units 11 and 19. Thus the PSDs 21 perform various routine processing functions so as to minimise the routine processing operations carried out by the units 11 and 19. As a consequence processor units 19 of different capabilities can more easily be used in one and the same apparatus and further units 19 can be added to an apparatus, if desired.

It will be understood that whilst in a processing apparatus according to the invention the first processor virtually always carries out essentially numerical i.e. 'number-crunching' operations, the second and third processors may carry out a very wide variety of different types of operation, depending on the nature and purpose of the controlled equipment. It will further be appreciated in this connection that in an apparatus according to the invention some of the units 19 and 27 may be arranged to carry out test and monitoring functions rather than functions directly related to the operation which the equipment controlled by the apparatus is intended to carry out.

It is further pointed out that whilst a single first processor unit 11 is used in the apparatus described by way of example, other apparatuses in accordance with the invention may have more than one first processor.

It will be appreciated that the architecture used in the signal processing apparatus of the accompanying drawing and other apparatuses in accordance with the invention, has the advantage that it enables an apparatus to be relatively easily reconfigured for use in any one of a wide variety of applications i.e. for use with a wide variety of sensors and control devices. Thus, to reconfigure an apparatus according to the invention for use in a different application requires, by and large, only a different external interface of the FSD. The choice of the number and types of first second and third processor units will of course also depend on the application, but these can each be selected individually without significantly affecting other parts of the apparatus.

I claim:

1. A signal processing apparatus for controlling control devices in dependence on signals derived from sensors, said signal processing apparatus comprising:
   (a) at least one first data processor for processing data carried by said signals, in addition to performing routine processing functions;
   (b) a plurality of second data processors for processing data produced by said first data processor, in addition to performing routine processing functions;
   (c) a plurality of third data processors for processing data produced by said second data processors, in addition to performing routine processing functions;
   (d) said first data processor having a higher operational speed than each of said second data processors, and each of said second data processors having a higher operational speed than each of said third data processors;
   (e) said first data processor having a lower logical decision capability than each of said second data processors, and each of said second data processors having a lower logical decision capability than each of said third data processors; and
   (f) a first data bus, said first data processor, each of said second data processors, and each of said third data processors being individually connected to said first data bus for transfer of data from said first data processor to said second data processors and from said second data processors to said third data processors.

2. A signal processing apparatus according to claim 1, including a further said third data processor acting as a controller for said apparatus.

3. A signal processing apparatus according to claim 1, including a second data bus, said first data processor and each of said second data processors being individually connected to said second data bus for transfer of data from said first data processor to said second data processors.

4. A signal processing apparatus according to claim 1, further including, for each said second data processor, a respective support device connected between said second data processor and said first data bus for reducing said routine processing functions performed by said second data processor.

5. A signal processing apparatus according to claim 1, further including, for each said third data processor, a respective support device connected between said third data processor and said first data bus for reducing said routine processing functions performed by said third data processor.

6. A signal processing apparatus according to claim 1, further including a support device connected between said first data processor and said first data bus for reducing said routine processing functions performed by said first data processor.

7. A signal processing apparatus according to claim 1, further including a global memory connected to said first data bus for use by said first data processor, said plurality of second data processors and said plurality of third data processors.

8. A signal processing apparatus according to claim 1, further including a support device connected to said first data bus for adapting said data output signals of said third data processors to a form suitable for use by said control devices.

* * * * *